(12) United States Patent
Cameron

(10) Patent No.: US 8,005,902 B2
(45) Date of Patent: Aug. 23, 2011

(54) SYSTEM AND METHOD FOR ACCELERATED DYNAMIC DATA MESSAGE GENERATION AND TRANSMISSION

(75) Inventor: John Cameron, Kew (AU)

(73) Assignee: CameronTec AB, Stockholm (SE)

( * ) Notice: Subject to any disclaimer, the term of this patent is extended or adjusted under 35 U.S.C. 154(b) by 619 days.

(21) Appl. No.: 11/586,229

(22) Filed: Oct. 24, 2006

(65) Prior Publication Data

US 2007/0094329 A1  Apr. 26, 2007

Related U.S. Application Data

(60) Provisional application No. 60/729,768, filed on Oct. 24, 2005.

(51) Int. Cl.
*G06F 15/16* (2006.01)
(52) U.S. Cl. .......... 709/206; 709/204; 709/205
(58) Field of Classification Search .......... 709/204, 709/206, 205
See application file for complete search history.

(56) References Cited

U.S. PATENT DOCUMENTS

| | | | | |
|---|---|---|---|---|
| 5,579,472 | A * | 11/1996 | Keyworth et al. | 715/751 |
| 5,917,489 | A * | 6/1999 | Thurlow et al. | 715/809 |
| 6,397,352 | B1 * | 5/2002 | Chandrasekaran et al. | 714/16 |
| 6,578,025 | B1 * | 6/2003 | Pollack et al. | 1/1 |
| 2002/0160805 | A1 * | 10/2002 | Laitinen et al. | 455/550 |
| 2002/0174183 | A1 * | 11/2002 | Saeidi | 709/206 |
| 2003/0028580 | A1 * | 2/2003 | Kucherawy | 709/101 |
| 2004/0039786 | A1 * | 2/2004 | Horvitz et al. | 709/207 |
| 2005/0091328 | A1 * | 4/2005 | Saeidi | 709/206 |
| 2006/0168329 | A1 * | 7/2006 | Tan et al. | 709/238 |

FOREIGN PATENT DOCUMENTS

GB  2401225 A  * 11/2004

OTHER PUBLICATIONS

Gwizdka, Jacek. 2002. TaskView: design and evaluation of a task-based email interface. In Proceedings of the 2002 Conference of the Centre for Advanced Studies on Collaborative Research (Toronto, Ontario, Canada, Sep. 30-Oct. 3, 2002). D. A. Stewart and J. H. Johnson, Eds. IBM Centre for Advanced Studies Conference. IBM Press, 4.*

* cited by examiner

*Primary Examiner* — Wing F Chan
*Assistant Examiner* — Kostas Katsikis
(74) *Attorney, Agent, or Firm* — Nixon & Vanderhye P.C.

(57) ABSTRACT

The speed of generating and transmitting electronic messages to one or more recipients over a communication link is dramatically increased. When processing a new outgoing message for transmission, the system identifies one or more portions of the message as belonging to a particular category included in a number of predetermined types of values. For each portion that is not already present in a category, the corresponding value is obtained and stored along with the message portion in the category. For each outgoing message that includes one portion that matches one or more of the portions stored, the system uses the stored values for the matching message portions of the outgoing messages, instead of performing processing on those message portions. Thus, instead of processing an entire outgoing message for transmission, the system only needs to process the portion of the message that is not found in any of the categories.

14 Claims, 6 Drawing Sheets

SYSTEM AND METHOD FOR ACCELERATED DYNAMIC DATA MESSAGE GENERATION AND TRANSMISSION

CROSS REFERENCE TO RELATED APPLICATION

The present patent application claims priority from the commonly assigned U.S. Provisional Patent Application Ser. No. 60/729,768, entitled "SYSTEM AND METHOD FOR ACCELERATED DYNAMIC DATA MESSAGE GENERATION AND TRANSMISSION", filed Oct. 24, 2005.

INTRODUCTION

The technology described below relates generally to a data processing system for generating and transmitting electronic messages over a communication network, and more particularly to a data processing system for dynamically accelerating generation and transmission of electronic messages that are similar to messages previously generated and transmitted by the system.

BACKGROUND

In recent years, with proliferation of low-cost and high-speed broadband connectivity, electronic messaging has become a part of everyday life. In addition, there has been a significant increase in utilization of electronic messaging in commercial applications. Generally, messaging can be separated into two categories: low volume (for example, such as messages exchanged between individuals or within groups of individuals); and high volume (for example, such as messages that are automatically sent out by various data processing systems, and that may contain information (e.g., stock prices) and/or instructions to perform particular tasks (e.g., to buy or sell stock shares).

Many companies in the financial sector increasingly rely on high volume electronic messaging to distribute key information and to conduct financial transactions. In many cases electronic messaging is implemented using a well-accepted real-time electronic messaging standard called the Financial Information Exchange (FIX) protocol. The FIX protocol is a messaging standard developed specifically for the real-time electronic exchange of securities transactions. FIX is a public-domain specification owned and maintained by FIX Protocol, Ltd., and as one of its key advantages, FIX enables communication between parties (e.g., financial institutions) with ostensibly disparate systems, thereby allowing for the transmission of critical transaction and financial data in a simple, highly structured message format.

Not surprisingly, the speed with which the messages can be sent by a messaging system is becoming more and more critical. For example, in the financial sector, traders who are able to receive and process messages from a market source, and submit order messages to the market faster than their rivals, have a real competitive advantage.

As a result, there has been a great deal of development in the field of high volume and high speed messaging systems and methodologies. In all cases, electronic messaging systems are implemented in a data processing hardware system equipped with software configured for processing and sending electronic messages, with the system being connected to a communication link so that messages can be sent to other systems. When messages are generated by a messaging system, they must be processed for transmission over the communication link. As an example, the processing may involve conversion of a message into a stream of bytes of a particular value, along with other determination of other values, such as a total number of bytes in a message, and a checksum value (or equivalent) used to enable the recipient system to determine whether the message was corrupted (or otherwise changed) during transmission.

Accordingly, the advances in field of high speed electronic messaging have all been related to improving the efficiency of message processing software, and more often to utilization of more and more powerful (and costly) computer systems. However, with increasing volume and transmission speed requirements of messaging applications, currently available systems have began to reach the limits of how fast messages can be generated, processed and sent using traditional methods, even utilizing the latest available hardware.

The reason for this limitation is that conventional high speed messaging systems prepare each outgoing message for transmission over a communication link, by processing the message from start to finish to obtain a number of predetermined types of values which are utilized to transmit the message, and to verify its receipt by the recipient(s). Referring now to Prior Art FIG. 6, the operation of a conventional messaging system is shown as a process 300 which may be performed for each outgoing message, sequentially or in parallel, or configured for batch operation of one or more steps. The outgoing message is generated/composed at a step 302, and at a step 304, the conventional messaging system performs all the necessary processing operations to prepare the message for transmission (e.g., calculate message length, checksum, etc.). The processed message is then transmitted at a step 306.

While this approach is reasonable for low volume messaging, it becomes very problematic when the desired message throughput increases to a high level (for example to tens of thousands (or more)) messages per second—as is the requirement with many financial applications. As a result, the cost/performance ratio of conventional messaging systems forms a virtual limit to the messaging throughput, as higher throughput requires a disproportionately higher investment in hardware and software.

It would thus be desirable to provide an electronic messaging system and method for accelerating the generation and transmission of electronic messages, providing a much higher messaging speed than a conventional electronic messaging system utilizing similar hardware.

SUMMARY OF THE INVENTION

The inventive data processing system and method dramatically accelerate the processes of generating and transmitting electronic messages to one or more recipients over a communication link. When the inventive system processes a new outgoing message for transmission, by obtaining a number of predetermined types of values, the system identifies one or more portions of the message as belonging to a particular category, and, for each portion that is not already present in the category, stores the corresponding obtained value along with the message portion in the category. Then, for each outgoing message that includes at least one portion that matches one or more of the portions stored in any of the categories, the system uses the stored values for the matching message portions of the outgoing messages, instead of performing processing on those message portions.

Thus, instead of processing an entire outgoing message for transmission, the inventive system only needs to process the portion of the message that is not found in any of the categories. Furthermore, as the number of stored and categorized processed message portions and corresponding values grows, the inventive system is able to utilize more and more of previously obtained values for outgoing messages. This technique greatly reduces the time required to prepare outgoing messages for transmission.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF EXAMPLE EMBODIMENTS

Figure 1:
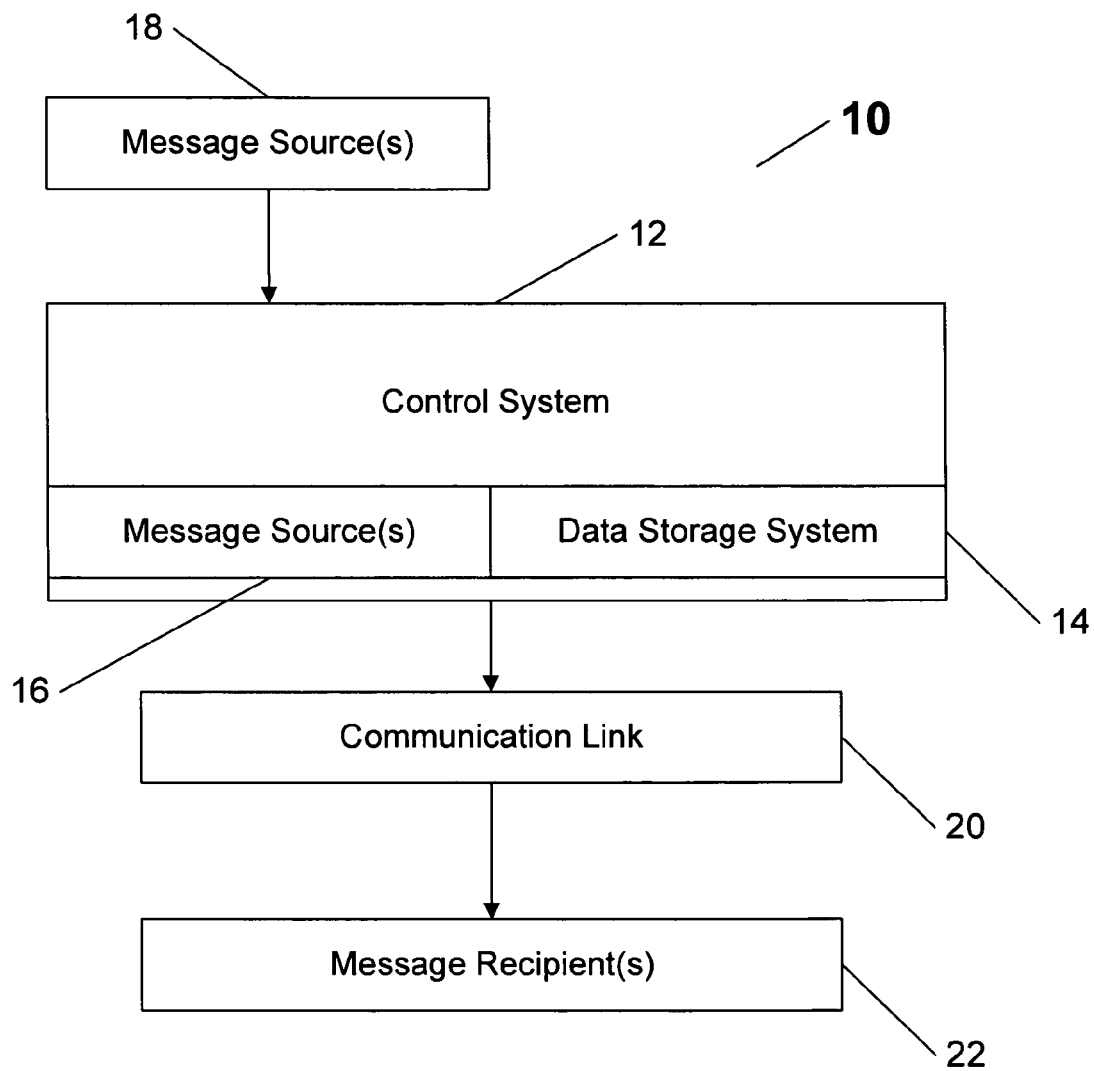
FIG. 1 shows a block diagram of an exemplary embodiment of a data processing system that dynamically accelerates generation and transmission of electronic messages.

The system and method described below remedy the disadvantages and limitations of previously known data processing messaging systems and methods, by greatly shortening the time required for generating and transmitting electronic messages, as compared to previously known systems. In contrast to the previously known techniques, rather than processing each outgoing message from start to finish, the inventive, system accumulates and stores a set of categorized processed portions of previously sent messages and obtains and stores their corresponding processed "values". Then, for each outgoing message that includes at least one portion having content that matches one or more of the portion values stored in any of the categories, the system uses the stored values for the matching message portions of the outgoing messages, instead of performing processing on those message portions.

Thus, instead of processing an entire outgoing message for transmission, the technology described below only needs to process the portion of the message that does not correspond to any values of stored portions of previously sent messages. As a result, the system and method, not only reduce the processing requirements for outgoing messages, but also greatly accelerate the message transmission process.

As the number of stored and categorized processed message portions and their values grows over time, the system is able to utilize more and more previously obtained values for outgoing messages, and greatly reducing the time required to prepare outgoing messages for transmission. Advantageously, the system thus dynamically improves its own performance over time.

While the system and method are described below in various embodiments with references to exemplary use in financial industry messaging applications, it should be understood to one skilled in the art, that the system and method may be readily and advantageously utilized for high speed transmission of any type of messages, for example, such as data items that have at least some degree of content repetition over time, including, but not limited to: text messages, program instruction messages (for causing remote systems to execute one or more predetermined functions), electronic mail messages, instant messages, short message service (SMS) messages, multimedia message service (MMS) messages, images, and audio and/or video files, without departing from the spirit of the described technology.

Furthermore, while only basic exemplary physical configurations of the system and its components are shown in the drawings, it should be noted that the system can be readily implemented in any computer system or electronic device having a control/data processing component (ranging from a single computer processor to a group of interconnected computer servers) and a data storage system for long term storage of data, and that is capable of connecting to a communication link that enables data transmission to one or more recipients.

As noted above, the technology involves configuring one or more predetermined categories that correspond to one or more portions of various outgoing messages, handled by the system, that have values likely to be repeated over time. Thus, message portions with values that are highly variable from message to message, are not suitable candidates for being categorized. The configuration of these categories may either be predefined by the operators of the system, or, optionally, may be automatically (or semi-automatically) generated by the system in accordance with one or more predetermined rules (for example, based on frequency of repetition of various message portions in outgoing messages).

The definition and utilization of categories can be done using at least one of the following techniques:

1) A category can be defined for a particular type of message portion (such as "Sell instructions"). As new outgoing messages are processed and corresponding values obtained for each portion, any message portions of types that fit into one or more categories are stored in those categories along with their corresponding values; Thus, using this technique, a particular category may be "Buy", with message portions relating to buy orders for various stocks, and the corresponding values (e.g., specific stock buy orders), stored therein.

2) Each category may correspond to a particular message portion itself, with only the value corresponding to that message portion stored therein. Thus, using this technique, a "Buy" category stores only the previously obtained values for the "Buy" portion of any outgoing message; and/or 3) A category can be defined for each type of entire outgoing message, and all non-variable message portions for that type of message, along with corresponding values, can be stored in that category. Using this technique, a "Buy Company XYZ Stock" category would store all message portions for a buy order for XYZ Stock, other than the quantity and the date/time of the order. This approach is particularly advantageous in many applications, because only a single "look-up" is required to obtain all non-variable message portion values.

Before each outgoing message is processed for transmission, the system preferably identifies any portions of the message that correspond to the ones stored in the categories for which values have been previously obtained, and retrieves those values, such that pre-transmission processing is only necessary for message portions that are not in the categories (or that have variable values). Optionally, to further accelerate this process, certain portions of outgoing messages that are not expected to have a certain predefined degree of value repetition from message to message, may be flagged as "variable" portions and not considered during the process of matching the portions of the message being prepared for transmission to categories of stored message portions.

Thus, the system minimizes the pre-transmission processing required, resulting in a dramatic increase in the speed of message transmission. Furthermore, the performance of the system can be additionally improved by balancing the number of categories and their contents with the degree of repetition of corresponding portions in outgoing messages, to ensure that the processing required to categorize each outgoing message, and retrieve the pre-obtained values, occurs faster and with greater efficiency than processing the message for transmission in its entirety. For example, experimental implementations of the inventive system and method have shown improvement in the time required to prepare and transmit a message by a factor of 5-10, as compared to conventional systems.

Referring now to FIG. 1, a first embodiment of the high speed messaging (HSM) system 10 is shown. Features of the HSM system 10 that are implemented in various example embodiments of the processes (described in greater detail below in connection with FIGS. 2-5), may be implemented in whole or in part as one or more executable programs, embedded functions, or other form of data processing tasks, by one or more components thereof These processes enable the user to fully utilize the previously summarized novel and advantageous features of the HSM system 10, as well as to take advantage of numerous other novel features and options described below in connection with various figures.

The HSM system 10 includes a control system 12 configured for performing the inventive processes of FIGS. 2-5, in addition to performing other functions. By way of example, depending on the complexity and volume of messages handled by the system 10, as well as upon other desired functionality, the control system 12 may range from a portable electronic device (such as a PDA or a smart phone), to a single personal computer, to a high capacity server or group of servers (configured with appropriate components, such as user interface hardware and software, operating system software, memory, communication components, security hardware/software, etc.). While the control system 12 may be dedicated to performing the described processes, it should be understood that the control system 12 may have a broad scope of functionality, where the functions relating to the inventive high speed messaging operations, are only a part of the overall tasks performed by the system.

The control system 12 includes, or is connected to, a data storage system 14 for long term storage of data, such as portions of previously sent messages and their corresponding previously obtained values. Preferably, the data storage system is configured with appropriate software to optimize high speed data access by the control system 12.

Outgoing messages may originate from one or more message source(s) 16 within the control system 12 (for example, a message to sell a certain amount of stock shares of a particular company automatically generated by the control system 12 in response to data received from a stock ticker system). Outgoing messages may also originate from one or more message sources 18 external to the control system 12 (for example, messages corresponding to a stock exchange ticker may be originated from a stock exchange system, with the system 12 instructed to transmit messages with ticker information to multiple recipients). Alternately, the message source 18 may include financial professionals sending buy or sell instructions as messages composed from their local terminals The control system 12 may be linked to one or more message recipients 22 (for example, one or more remote computer systems or other communication devices) through a communication link 20. The communication link 20 may include, but is not limited to, one or more high speed telecommunication links, for example, high speed communication lines (such as cable, DSL, T1 or T3 lines), the Internet, high speed secure wireless transmission links (for example, cellular, satellite, or line of sight laser communication links), local or wide area network connections, direct dedicated high speed lines, or a combination of two or more of any of the above.

As noted above, in connection with FIG. 1, features and operation of the HSM system 10 are controlled and configured by performance of one or more processes implemented as data processing tasks (such as stand-alone programs, macros, applets, program modules, programs, or any other form of executable task performance instruction sets), that are executed by the control system 12.

Nevertheless, for the sake of clarity, and without any limitation from the nomenclature, the core data processing task responsible for enabling the key operations of the HSM system 10, that is performed by the control system 12, will hereinafter be referred to as a "main process", while additional data processing tasks, such as procedures initiated by the main process, will hereinafter be referred to as a "sub-process".

Referring now to FIGS. 2 through 5, exemplary embodiments of a main process 30, and of a main process 50 and sub-processes 100 and 150, are shown. It should be noted, that only those steps necessary or desirable for HSM system 10 operation are shown. It is contemplated that execution of application programs and program modules, as implemented in various types or configurations of control systems 12, may involve numerous conventional processes and steps not shown here.

Figure 2:
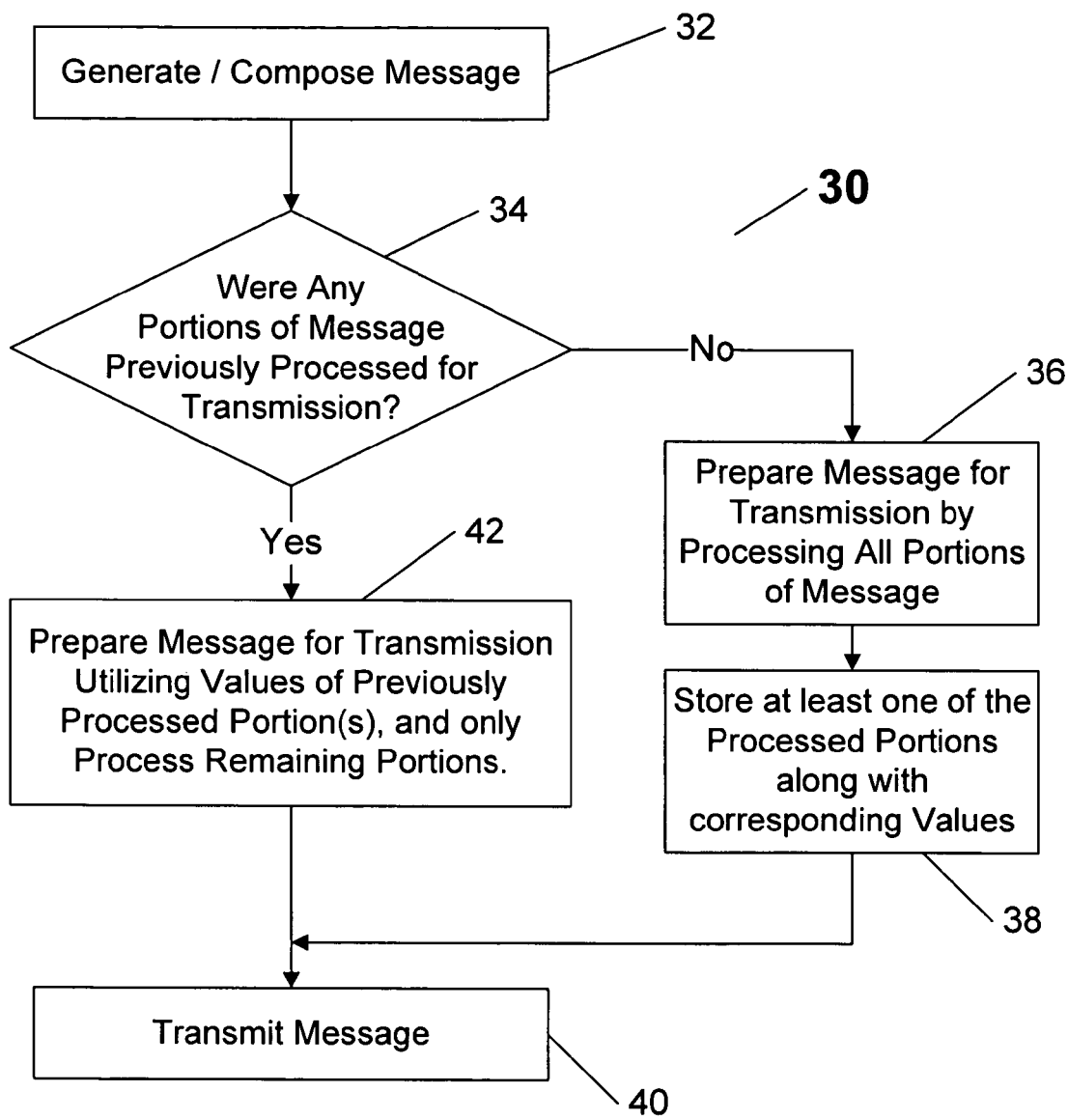
FIG. 2 shows a process flow diagram of a first embodiment of an exemplary process executed by the data processing system of FIG. 1.

Referring now to FIG. 2, a first example embodiment is shown as the main process 30, which begins at a step 32 where an outgoing message is generated from message source 16 or 18. At a test 34, the control system 12 determines whether any portion of the outgoing message has been processed for transmission at some previous time, and, if no previous processing occurred, at a step 36 the control system 12 prepares the message for transmission by processing all of its portions. At a step 38, the control system 12 identifies and stores at least one processed portions and corresponding value(s) that is likely to be reusable. As noted above, the determination of "reusability" may be made automatically in accordance with one or more predefined rules, or under direction of an operator of the control system 12. The message is then transmitted at a step 40.

If at the test 34, the control system 12 determined that at least one of the message portions were previously processed, at a step 42, the control system 12 prepares the message for transmission by utilizing the values previously obtained for the previously processed message portions, and only processes the remaining message portion(s). The message is then transmitted at the step 40.

Figure 3:
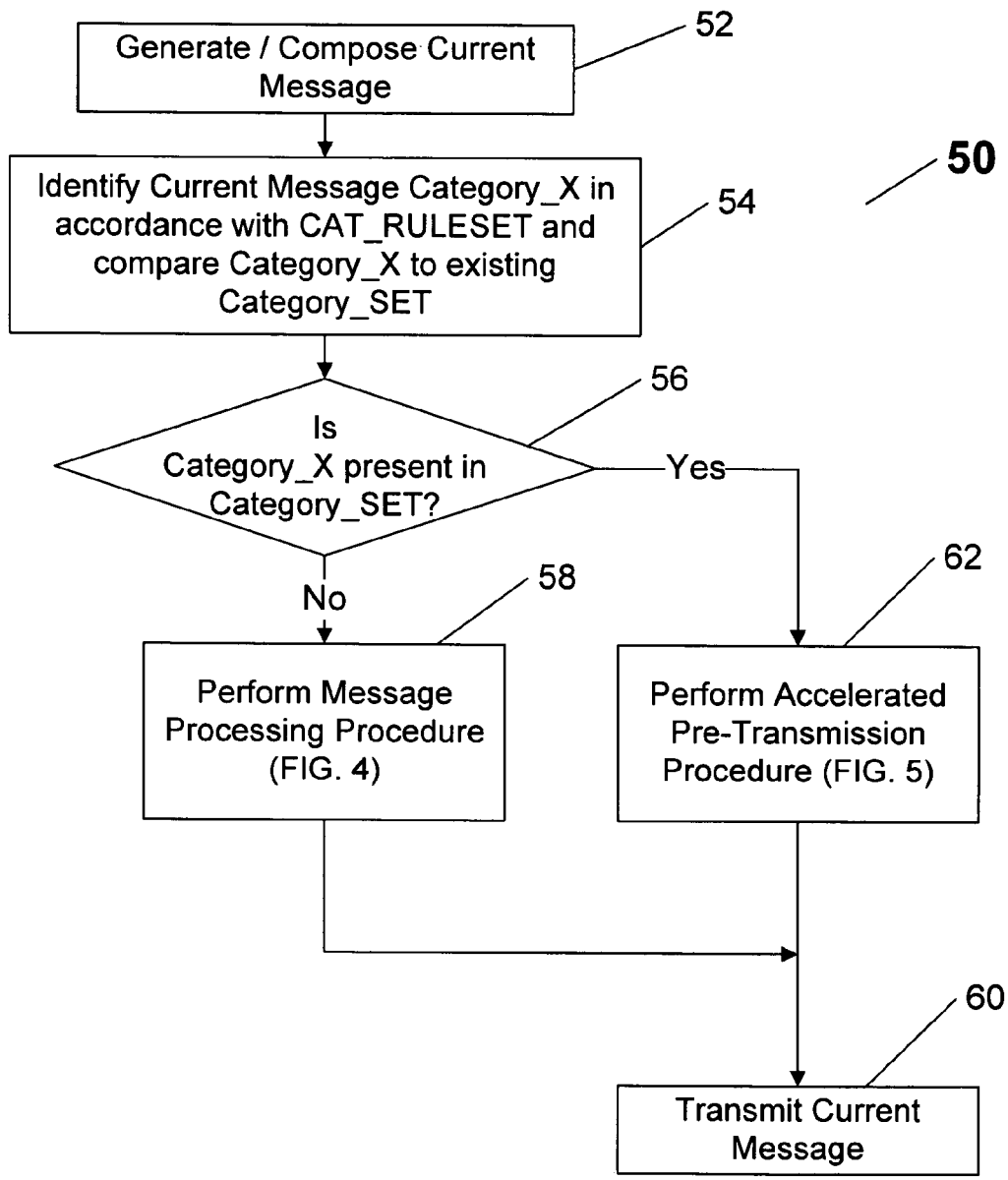
FIG. 3 shows a process flow diagram of a second embodiment of an exemplary process executed by the data processing system of FIG. 1.

Referring now to FIG. 3, a second example embodiment is shown as the main process 50. By way of example, the main process 50 is shown as utilizing the above-described third technique of category configuration in which categories are based on predetermined message types. Each particular Category_X (1 . . . N) is preferably created (and selected) in accordance with a predetermined set of rules ("CAT_RULESET"), and is preferably stored in the data storage system 14 as a Category_SET. In one embodiment of the present invention, one or more of the Category_X may be dynamically generated by the control system 12 during previous executions of the process 50 (see step 102, FIG. 4). In another example embodiment, each Category_X is pre-selected (for example, by an authorized operator or administrator). Several other parameters are also utilized by the process 50, shown in Table 1, below.

TABLE 1

Parameter Definitions for Process 50

| Parameter | Definition |
| --- | --- |
| REUSABLE | A portion of a message having a value that is likely to be repeated in a future outgoing message |
| VARIABLE | A portion of a message with a value that is not likely to be repeated in a future outgoing message (or that would be repeated infrequently) |
| MP_RULESET | A set of predetermined rules for identifying whether a particular message portion is REUSABLE or VARIABLE |
| VALUE_SET_R | One or more values obtained for each REUSABLE message portion during pre-transmission processing |
| VALUE_SET_V | One or more values obtained for each VARIABLE message portion during pre-transmission processing |
| PARAMETER_SET | One or more parameters for a message that do not constitute a message portion |

The process 50 begins at a step 52, where an outgoing current message is generated from the message source 16 or 18. At a step 54, the control system 12 identifies the category most appropriate to the current message and compares the Category_X to Categories in the existing Category_SET. At a test 56, the control system 12 determines if the Category_X is present in the Category_SET. If it is not, at a step 58, the control system 12 performs a Message Processing Procedure, shown by way of example as a sub-process 100 of FIG. 4.

Figure 4:
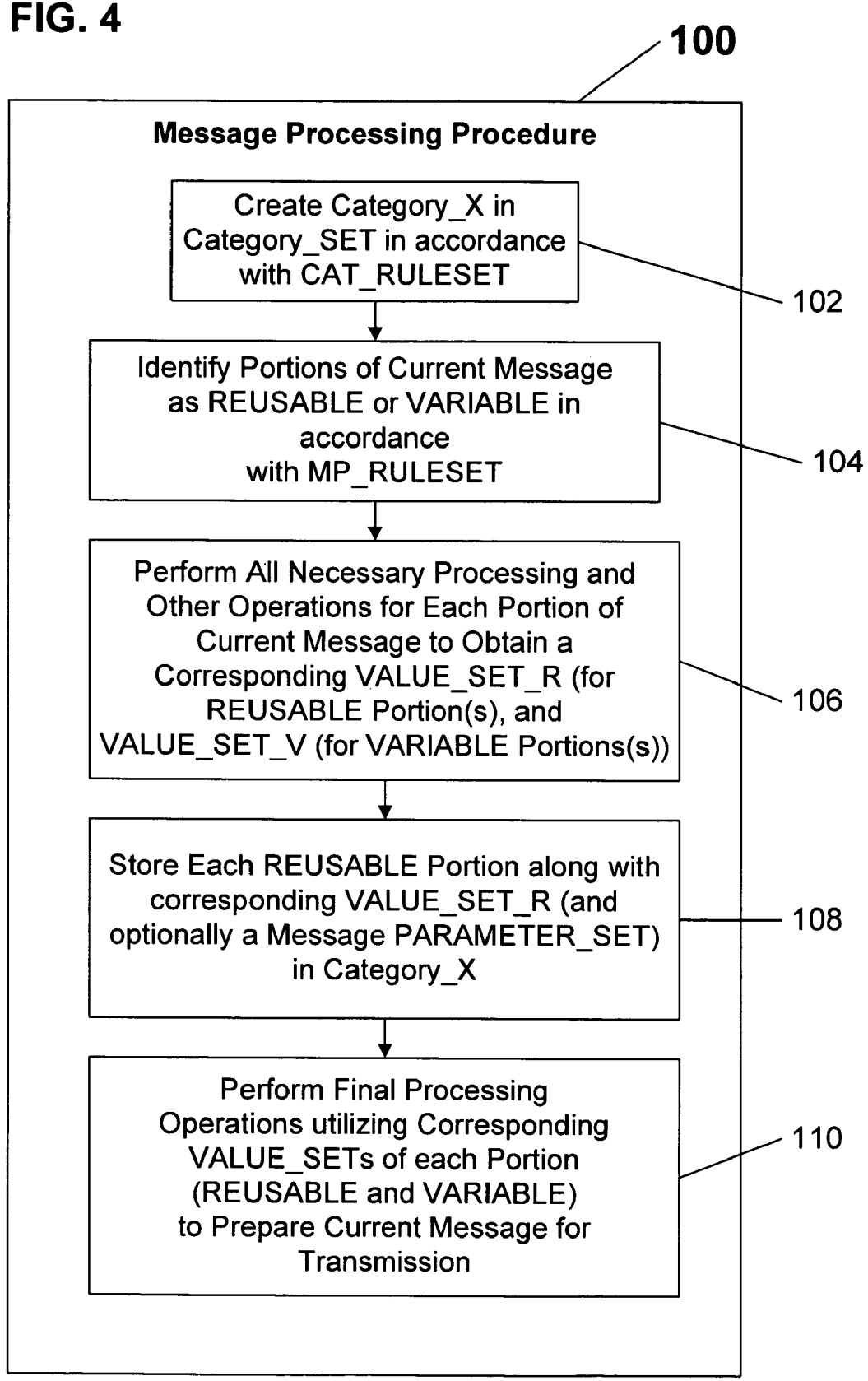
FIG. 4 shows a process flow diagram of an exemplary message processing procedure component of the process of FIG. 3.

Referring now to FIG. 4, the sub-process 100 begins at a step 102, where the control system 12 creates a Category_X in the Category_SET in accordance with the CAT_RULESET, and, at a step 104, identifies one or more portions of the current message as REUSABLE or VARIABLE in accordance with the MP_RULESET. As noted above, the step 102 may be either automatic or performed under direction of a system operator or administrator. At a step 106, the control system 12 performs all necessary processing and other operations for each portion of the current message to obtain a corresponding VALUE_SET_R (for REUSABLE message portion(s), and, optionally, a VALUE_SET_V (for VARIABLE message portions(s)). At a step 108, the control system 12 stores each REUSABLE portion along with its corresponding VALUE_SET_R (and optionally a Message PARAMETER_SET) in Category_X, and, at a step 110, the control system 12 perform final processing operations utilizing corresponding VALUE_SETs of each portion (REUSABLE and, optionally, VARIABLE) to prepare current message for Transmission Accordingly, by performing the steps 102 to 110 of FIG. 4, the control system 12 not only processes the current message for transmission at a step 60 (FIG. 3), but also stores one or more appropriate REUSABLE message portions and corresponding VALUE_SET_R in a newly created Category_X for future use.

Figure 5:
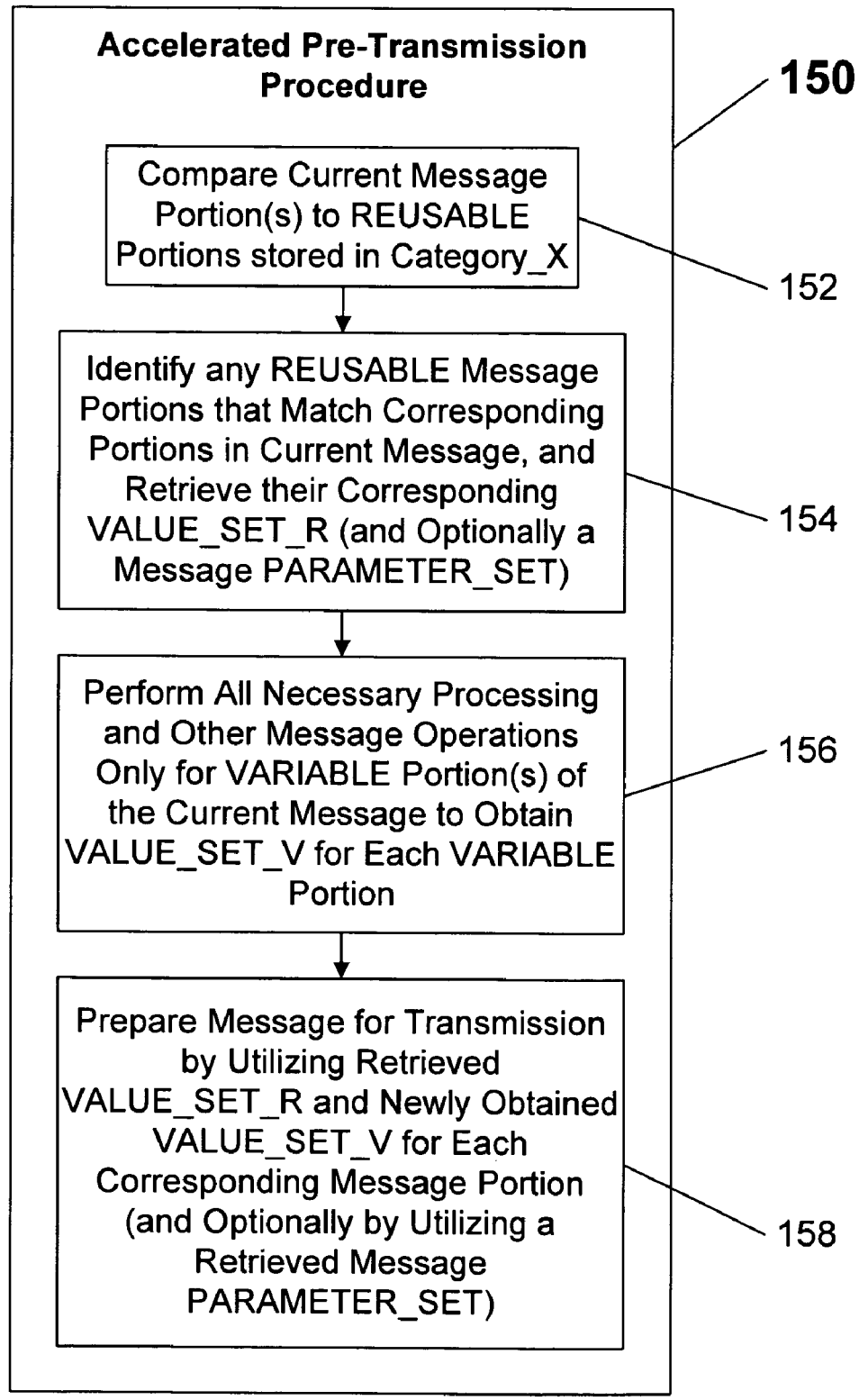
FIG. 5 shows a process flow diagram of an exemplary accelerated pre-transmission procedure component of the process of FIG. 3.
Figure 6:
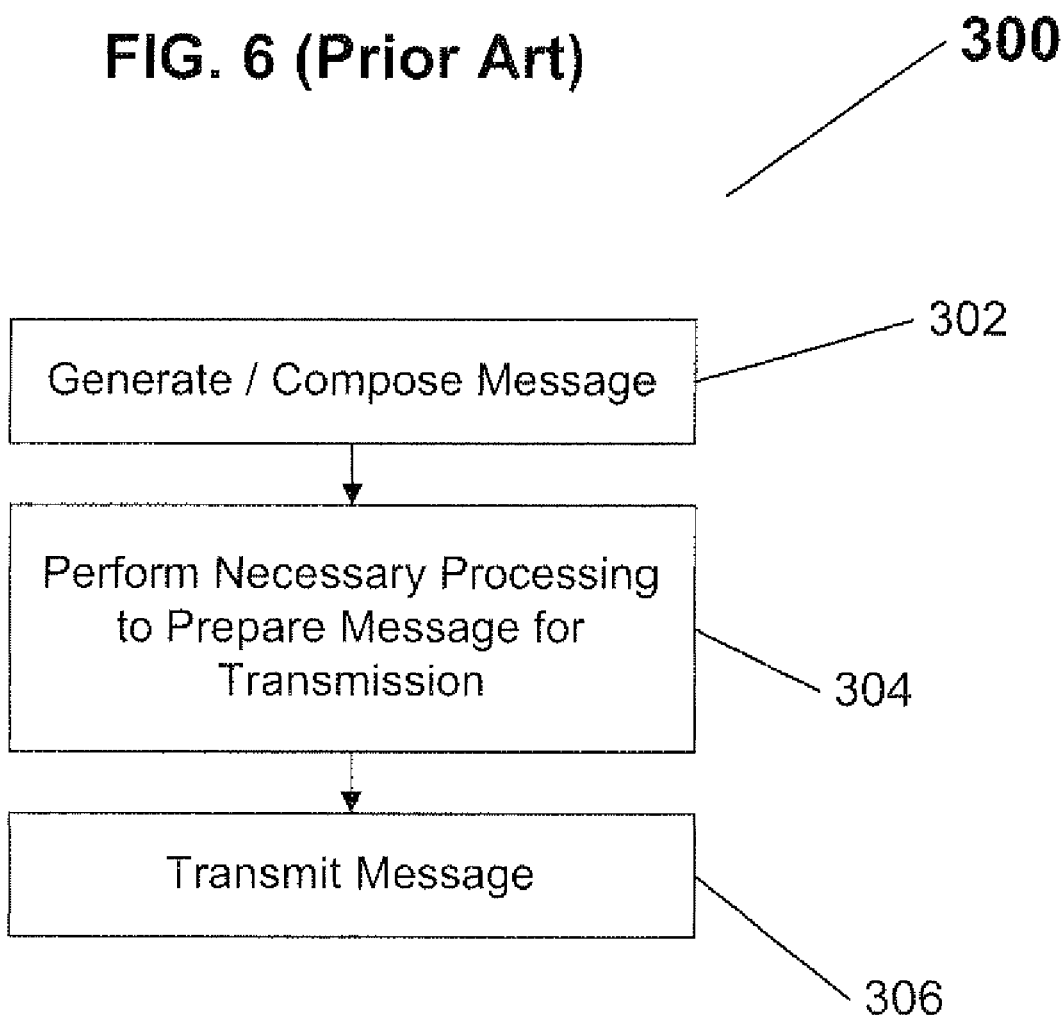
FIG. 6 (Prior Art) shows a process flow diagram of an exemplary prior art process of generating and transmitting electronic messages.

Returning now to FIG. 3, if at the test 56, the control system 12 determined that the Category_X is present in the Category_SET, then at a step 62, the control system 12 performs an Accelerated Pre-Transmission Procedure, shown by way of example as a sub-process 150 of FIG. 5.

Referring now to FIG. 5, the sub-process 150 begins at a step 152 where the control system 12 compares the current message portion(s) to the REUSABLE portions stored in Category_X, and at a step 154, identifies any REUSABLE message portions that match corresponding portions in the current message, and retrieve their corresponding VALUE_SET_R (and optionally a message PARAMETER_SET). At a step 156, the control system 12 performs all necessary processing and other message operations only for VARIABLE portion(s) of the current message to obtain a VALUE_SET_V for each VARIABLE portion. At a step 158, the control system 12 prepare the message for transmission by utilizing the retrieved VALUE_SET_R and Newly Obtained VALUE_SET_V for each corresponding message portion (and optionally by utilizing a retrieved message PARAMETER_SET)

Accordingly, by performing steps 152 to 158 of FIG. 5, the control system 12 uses existing VALUE_SET_R for each REUSABLE portion of the message and only obtains VALUE_SET_V for the VARIABLE portion(s), thus greatly reducing the time required to prepare the current message for transmission.

In an alternate example embodiment, the processes 30, 50 can be readily configured to generate message content instead of, or in addition to, dynamic message processing. In this case, actual message portions content can be stored in the various categories of the Category_SET and the content of a desired outgoing message can be automatically generated in response to a general command by the message originator. This functionality can be implemented along with the functionality described above in connection with FIGS. 2-5. For example, if a trader issues a command to buy 1,000 shares of XYZ company stock when it reaches a certain price, the inventive system 30, 50 can generate the actual content of this message with appropriate formatting and data to meet transmission protocol (e.g., FIX) requirements from portions of content of similar previously sent messages, and then utilize the processes 30 or 50 to prepare the message for transmission.

Thus, while there have been shown and described example embodiments, it will be understood that various omissions and substitutions and changes in the form and details of the devices and methods illustrated, and in their operation, may be made by those skilled in the art. For example, it is expressly intended that all combinations of those elements and/or method steps which perform substantially the same function in substantially the same way to achieve the same results are within the scope of the claims. It is the intention, therefore, to be limited only as indicated by the scope of the claims appended hereto.

I Claim:

1. A method for dynamically accelerating a procedure of pre-transmission processing of an outgoing electronic message having a plurality of message portions, utilized in conjunction with a control system operable to selectively process content of each message portion to generate a corresponding processed message portion value comprising electronic data, in a form that is suitable for immediate electronic transmission over a communication link, and that is representative of the processed message portion content, in preparation for an accelerated transmission of the outgoing electronic message over the communication link, comprising the steps of:

(a) defining at least one category based on a predetermined reusability factor of at least one previously transmitted message portion corresponding thereto;

(b) identifying, by the control system, at least one corresponding processed message portion value that has been previously-generated for at least one previously-processed message portion of a previously-transmitted outgoing electronic message, that is identical to at least one message portion of the outgoing electronic message, and automatically assigning said identified at least one corresponding previously-generated processed message portion value to said at least one message portion, without processing of the content thereof to dynamically accelerate pre-transmission processing of the outgoing electronic message;

(c) processing by the control system, the content of at least one other message portion of the outgoing electronic message to generate at least one corresponding other processed message portion value therefor; and (d) outputting a total processed message value comprising said identified at least one corresponding previously-generated processed message portion value and said at least one corresponding other processed message portion value corresponding to said at least one other message portion.

2. The method of claim 1, further comprising the step of:

(e) assigning, by the control system, each said at least one other message portion, along with its at least one corresponding other processed message portion value generated at said step (b), to said at least one category, each representative of a predefined type of an electronic message corresponding to said at least one other message portion, such that thereafter each such at least one other message portion is thereafter considered to be a corresponding at least one previously transmitted message portion.

3. The method of claim 2, wherein said step (b) further comprises the step of:

(f) comparing, by the control system, each of the at least one message portions to said message portions previously assigned to said at least one category, to identify at least one match thereof with at least one previously transmitted message portion of said at least one category.

4. The method of claim 1, wherein said reusability factor is at least partially determined by a frequency of repetition of said at least one previously transmitted message portion in previously processed and transmitted outgoing electronic messages.

5. The method of claim 1, wherein the outgoing electronic message includes financial data.

6. The method of claim 5, wherein the financial data includes one or both of stock prices and stock trading information.

7. A data processing method, implemented utilizing a control system, for dynamically accelerating transmission of an outgoing electronic message over a communication link, comprising the steps of:

(a) determining, by the control system, if at least one previously-generated message transmission value comprising electronic data in a form that is suitable for immediate electronic transmission over a communication link and corresponding to at least one reusable portion of a previously-sent electronic message that matches at least one portion of the outgoing electronic message is available for use in electronic transmission of the outgoing electronic message;

(b) preparing the outgoing electronic message for transmission using said at least one previously-generated message transmission value for said corresponding at least one portion of the outgoing electronic message to dynamically accelerate pre-transmission processing of the outgoing electronic message, and generating, by the control system, at least one additional message transmission value corresponding to at least one additional portion of the outgoing electronic message;

(c) for said at least one additional message transmission value, storing said at least one additional message transmission value such that said at least one additional message transmission value is identified as corresponding to the at least one additional portion of the outgoing electronic message, and (d) electronically transmitting the outgoing electronic message over the communication link using at least one of said at least one previously-generated message transmission value and said at least one additional message transmission value.

8. The method of claim 7, wherein the outgoing electronic message includes financial data.

9. The method of claim 8, wherein the financial data includes one or both of stock prices and stock trading information.

10. The method of claim 7, wherein the outgoing electronic message is transmitted using said at least one message transmission value at a time earlier than if the at least one message had to be generated rather than being previously-generated.

11. A data processing system for accelerating a procedure of pre-transmission processing of an outgoing electronic message having a plurality of message portions being operable to selectively process content of each message portion to generate a corresponding processed electronic data record in a form that is suitable for immediate electronic transmission over a communication link, and that is representative of the processed message portion content, in preparation for an accelerated transmission of the outgoing electronic message for transmission over the communication link, comprising:

a data storage system configured to store reusable electronic data records, each corresponding to content of a message portion of at least one previously-processed outgoing electronic message to dynamically accelerate pre-transmission processing of the outgoing electronic message;

a control system, comprising a processor coupled to a memory, configured to:

compare at least a part of the content of at least one message portion of the outgoing electronic message to previously-transmitted message content represented by a corresponding one of said reusable electronic data records, determine that said compared content matches previously-transmitted content, and in response, output at least one corresponding reusable electronic data record as a pre-processed electronic data message file;

for at least one other message portion in addition to said at least one message portion, generate an additional electronic data record corresponding thereto and output said additional electronic data record as an additional electronic data message file; and output a complete transmission-ready electronic data message file comprising at least one of said pre-processed electronic data message file and said additional electronic data message file.

12. The data processing system of claim 11, wherein the outgoing electronic message includes financial data.

13. The data processing system of claim 12, wherein the financial data includes one or both of stock prices and stock trading information.

14. The data processing system of claim 11, wherein the control system is configured to output the complete transmission-ready electronic data message file faster using said pre-processed electronic data message file than if the matching content had to be processed in real time.

* * * * *